July 28, 1953   F. H. ROBERTSON   2,646,786
CYLINDRICAL OBJECT EJECTING APPARATUS
Filed Oct. 11, 1950   3 Sheets-Sheet 1

Inventor
Frank Henry Robertson
By Moses, Nolte, Crews & Berry
Attorneys

July 28, 1953  F. H. ROBERTSON  2,646,786
CYLINDRICAL OBJECT EJECTING APPARATUS
Filed Oct. 11, 1950  3 Sheets-Sheet 2

Inventor
Frank Henry Robertson
By Moses, Nolte, Crews & Berry
Attorneys

Patented July 28, 1953

2,646,786

UNITED STATES PATENT OFFICE 2,646,786

CYLINDRICAL OBJECT EJECTING APPARATUS

Frank Henry Robertson, Carisbrooke, Isle-of-Wight, assignor to Saunders-Roe Limited, Osborne, England Application October 11, 1950, Serial No. 189,616
In Great Britain October 12, 1949

7 Claims. (Cl. 124—26)

This invention has for its object to provide mechanism whereby a number of objects carried on the periphery of a rotatable drum may be successively ejected from the drum in a radial direction.

The mechanism according to the invention comprises retaining members, one for securing each object to the drum, means for rotating the drum to bring the objects in succession to a discharge position, a normally cocked ejector adapted, when freed, to eject the object at the discharge position, a manual control device for freeing the ejector for movement, means operated on movement of the ejector to release the retaining member of the object at the discharge position, and means operated by the ejector, after ejection of the object, for automatically recocking the ejector.

One specific application of the invention is to the ejection of buoys or floats from the body of an aircraft. It is particularly suitable in the case of Sono buoys. A Sono buoy is a device for detecting submerged submarines and comprises a floating Asdic set and a radio transmitter arranged, when the buoy strikes the water, to emit automatically a radio signal representative of the received echo, the wave length differing for each buoy. These buoys are large and heavy and cannot easily be discharged manually from the aircraft.

Figure 1:
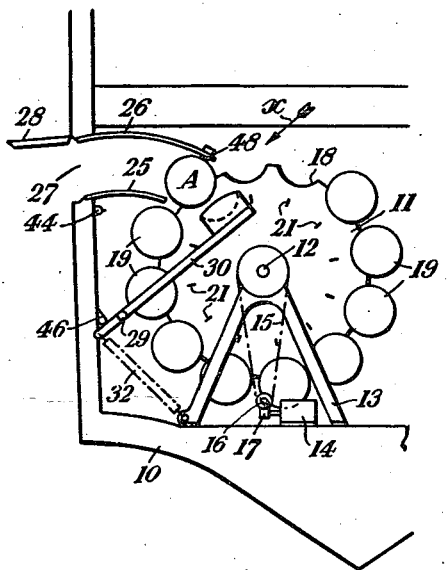
Figure 2:
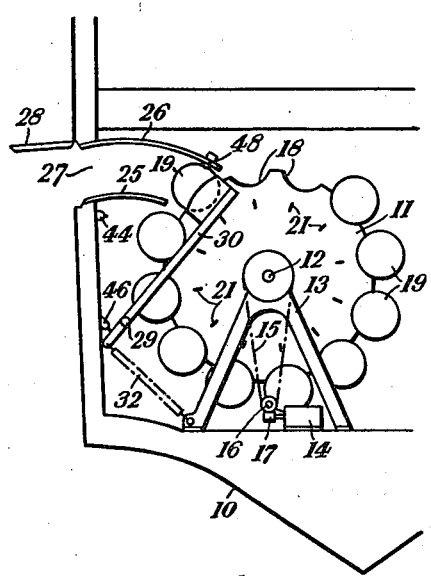
Figure 5:
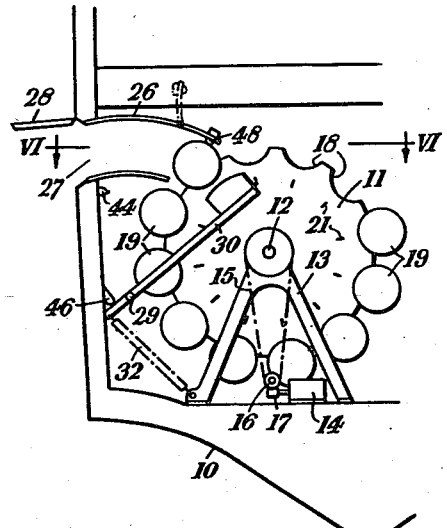
Figure 7:
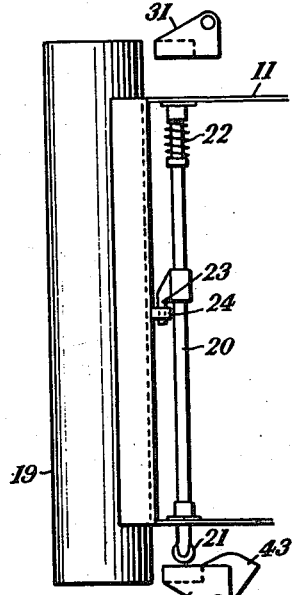
Figure 6:
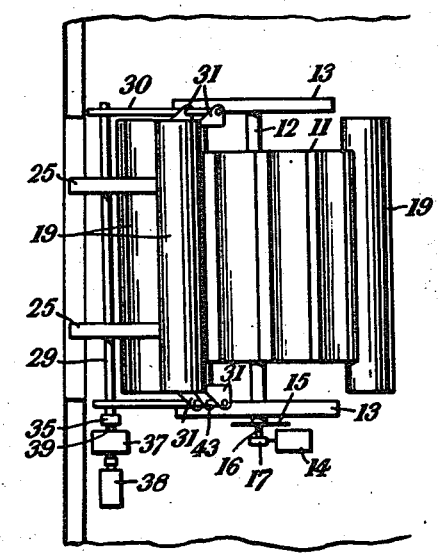
Figure 8:
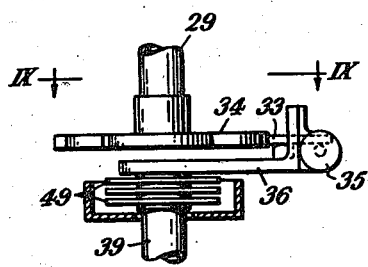
Figure 9:
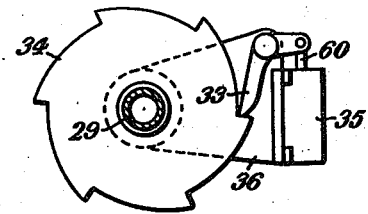
Figure 10:
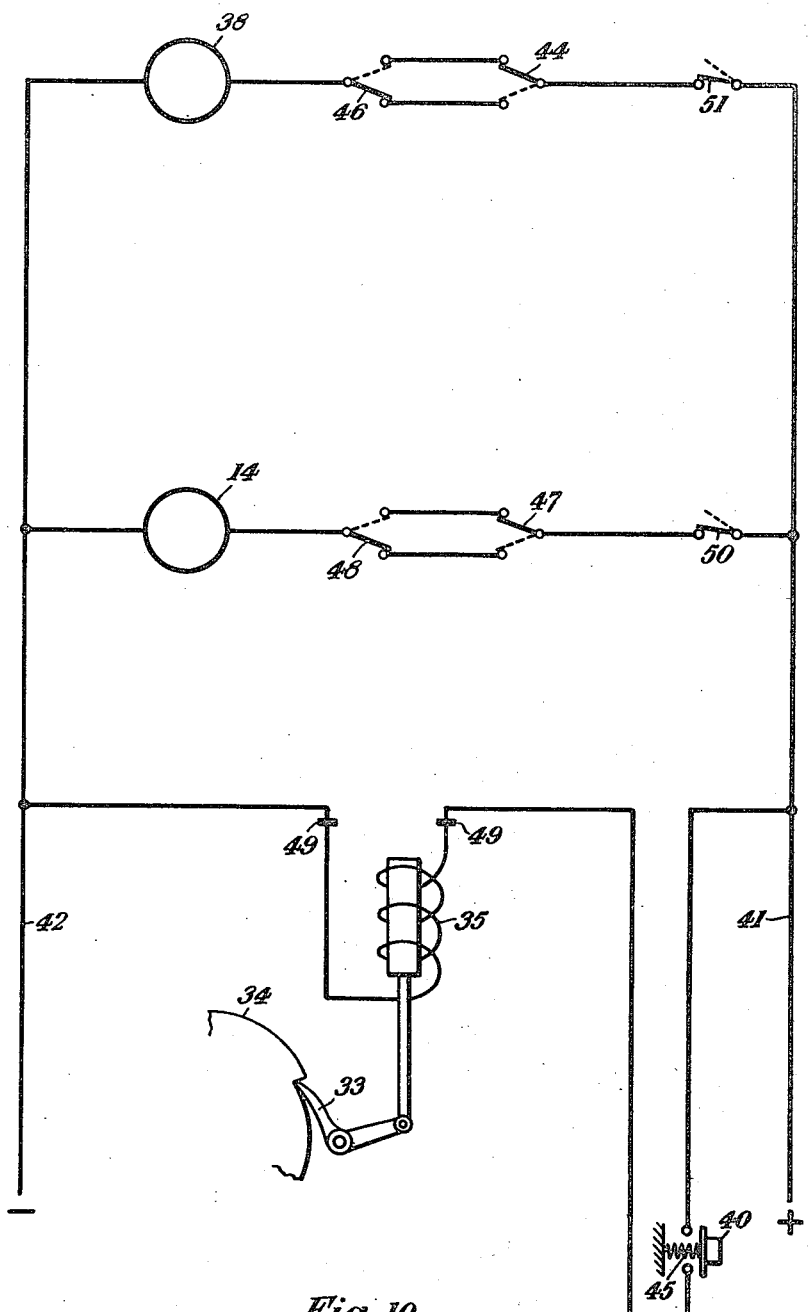

One form of ejecting apparatus according to the invention, suitable for the ejection of Sono buoys from an aircraft, will now be described in detail, by way of example, with reference to the accompanying drawings, in which:

Figs. 1-5 are end elevations of the apparatus, showing the same in successive positions occupied during ejection of a buoy, Fig. 6 is a section on the line VI—VI in Fig. 5, Fig. 7 is an enlarged detail view, looking in the direction of the arrow x in Fig. 1, Fig. 8 is an enlarged plan view of the ratchet on the ejector shaft and associated solenoid-controlled latch, Fig. 9 is a section on the line IX—IX in Fig. 8, and Fig. 10 is a circuit diagram.

Within the hull 10 of a flying boat is mounted a drum 11, fixed to a shaft 12 supported in bearings in a pair of upstanding brackets 13. The shaft 12 is adapted to be rotated intermittently in a clockwise direction, as seen in Figs. 1-5, by an electric motor 14. The motor drives a shaft 16 below the shaft 12 through a worm drive 17, and the shaft 16 drives the shaft 12 through a chain drive 15.

The shaft 12 extends parallel to the fore and aft centre line of the hull 10, but is offset laterally therefrom. In the periphery of the drum 10 are twelve part cylindrical recesses 18 for the accommodation of buoys 19. Beneath each recess 18 is a retaining plunger 20 (Fig. 7) which is slidably mounted in the drum 11 and carries a roller 21 projecting from the end wall of the drum. The plunger 20 is normally held by a spring 22 in the position shown in Fig. 7, in which a projection 23 on the plunger engages a retaining ring 24 on the buoy 19 in the associated recess 18, so locking the buoy to the drum. The recess 18, of course, is formed with an aperture through which the ring 24 projects for engagement by the plunger.

As described later in detail, the drum is rotated step-by-step, in clockwise direction, to bring the buoys 19 successively into the discharge position, indicated at A in Fig. 1. Fig. 1 shows the state of affairs in which two of the buoys have been discharged and the third buoy has arrived at the discharge position. The buoy in the discharge position can be discharged radially from the drum through a discharge chute constituted by superposed pairs of plates 25, 26, to an opening 27 in the hull and thence to the exterior of the hull. A door 28 is provided for opening and closing the opening 27 at the will of the operator.

Parallel to the shaft 12 of the drum 11 is an ejector shaft 29, which is supported in bearings (not shown) and carries a pair of ejector arms 30, each of which has on its free end a pair of ejector plates 31 for coaction with the buoy 19 at the discharge position. A spring 32 (Figs. 1-5) tends to rock the shaft 29 counter-clockwise, but such movement is normally prevented by coaction of a pawl 33 (Fig. 9) with a ratchet 34 mounted on the shaft 29. The pawl 33 is controlled by a solenoid 35 mounted on a bracket 36, fixed to a shaft 39 which can be driven, through a gear box 37, by an electric motor 38 (Fig. 6) for the purpose of recocking the ejector mechanism as described later. The pawl 33 is connected to a plunger 60 which is normally caused by a spring (not shown) within the solenoid 35 to hold the pawl 33 engaged with the ratchet 34 as shown in Fig. 9. When however the solenoid 35 is energised, as described later, the plunger 60 is attracted, thereby freeing the pawl 33 from the ratchet 34. Slip rings 49 (see also Fig. 10) are provided for conducting energising current to the solenoid 35.

Figure 3:
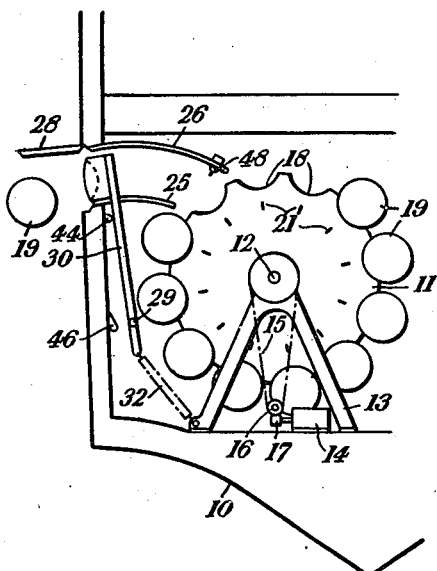
Figure 4:
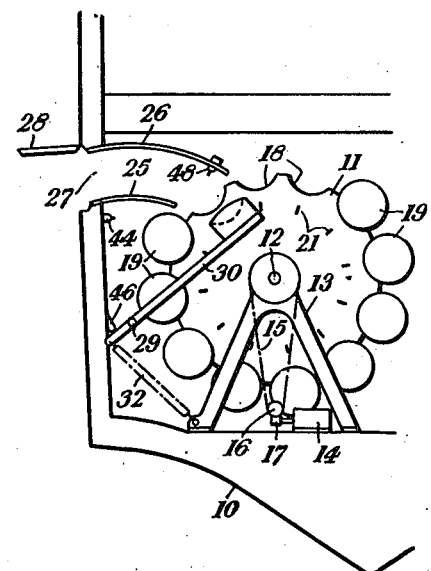

When a buoy is to be discharged, the operator actuates a switch 40 (Fig. 10) to complete a circuit between lines 41, 42. This energises the solenoid 35 and frees the pawl 33 from the ratchet 34. The ejector arms 30 then move under the action of the spring 32 to the position shown in Fig. 2 in which they engage opposite ends of the buoy 10 at the discharge position. Just prior to engagement of the ejector arms 30 with the buoy 39, a cam 43 (Figs. 6 and 7) on the ejector arm nearest the roller 21 engages the roller and forces the retaining plunger 20 of the buoy back against its spring 22 to release the buoy 19 and permit its ejection from the drum as shown in Fig. 3.

On completion of their ejection movement one of the ejector arms 30 engages a limit switch 44. Movement of the switch 44 to the position shown in dash lines in Fig. 10 completes a circuit to start the motor 38 for recocking the ejector mechanism. The shaft 39 is then driven to rotate the bracket 36 clockwise as seen in Fig. 9. Release of pressure on the push button switch 40 (Fig. 10) has meanwhile allowed a spring 45 to open that switch so that the solenoid 35 is de-energised and the pawl 33 drives the ratchet 34 clockwise to return the ejector arms 30 to the position of Fig. 4. When the arms 30 reach this position, they coact each with one of a pair of limit switches 46, 47 (Fig. 10), one only of which is shown in Figs. 1-5, thereby moving these switches to the positions shown in dash lines in Fig. 10. The movement of the switch 46 to its new position breaks the circuit to the recocking motor 38, while the movement of the switch 47 to its new position starts the motor 14 for driving the drum 11. The drum then travels clockwise until it reaches the position shown in Fig. 5, at which the fourth buoy has arrived at the discharge position, and operates a limit switch 48 carried by one of the plates 26. Movement of this switch to the dash position in Fig. 10 then breaks the circuit to the motor 14 and stops the rotation of the drum.

The operator, by pressing the switch 40 from time to time, can thus eject the buoys in succession. When the last buoy has been ejected, the switch 48 will no longer be operated to stop the motor 14, and the motor 14 will accordingly continue to rotate the drum 11 until a switch 50 (Fig. 10) is opened by the operator. This switch 50 can be used to facilitate positioning of the drum during reloading. The limit switch 48 can be swung out of operative position, as shown in dotted lines in Fig. 5, so as not to interfere with control of the position of the drum by the switch 50 during reloading. A switch 51 is provided for isolating the recocking gear.

If it is desired to provide for discharge of the buoys in other than direct processional sequence, the control of the motor for rotating the drum may be divorced from the recocking gear, and the operator may be provided with a series of switches, one corresponding to each buoy, which are wired to the motor so that the drum may be turned to bring any selected buoy to discharge position, an indicator being provided for showing which buoys have already been discharged.

Similar apparatus, but on a smaller scale, may be used for sequential discharge from the aircraft of marine marker or flame floats.

What I claim as my invention and desire to secure by Letters Patent is:

1. Ejecting apparatus comprising a rotatable drum having in its periphery a plurality of longitudinal recesses each adapted to receive an object, a retaining member in each recess for securing the object in said recess to the drum, power means for rotating the drum about its axis, to bring said objects in succession to a discharge position, pivotally mounted ejector mechanism disposed adjacent to said drum, a cocking device for normally retaining said ejector mechanism in cocked position, resilient means urging said ejector mechanism to move from its cocked position into engagement with the object at the discharge position, means operative on movement of the ejector mechanism from its cocked position towards the object at the discharge position for releasing the retaining member associated with said object, manually operable means for releasing the cocking device to free said ejecting mechanism for movement to engage said object and eject it radially from the drum, and means coacting with said ejector mechanism after ejection of said object for automatically returning it to cocked position.

2. Ejecting apparatus comprising a rotatable drum having in its periphery a plurality of longitudinal recesses each adapted to receive an object, a retaining member in each recess for securing the object in said recess to the drum, power means for rotating the drum about its axis, to bring said objects in succession to a discharge position, pivotally mounted ejector mechanism disposed adjacent to said drum, a cocking device for normally retaining said ejector mechanism in cocked position, resilient means urging said ejector mechanism to move from its cocked position into engagement with the object at the discharge position, means operative on movement of the ejector mechanism from its cocked position towards the object at the discharge position for releasing the retaining member associated with said object, manually operable means for releasing the cocking device to free said ejector mechanism for movement to engage said object and eject it radially from the drum, means coacting with said ejector mechanism after ejection of said object for automatically returning it to cocked position, and means actuated by said ejector mechanism, on its return to cocked position, for automatically operating said power mechanism to bring the next object to the discharge position.

3. Ejecting apparatus comprising a rotatable drum having in its periphery a plurality of longitudinal recesses each adapted to receive an object, a retaining member in each recess for securing the object in said recess to the drum, an electric motor for rotating said drum, pivotally mounted ejector mechanism disposed adjacent to said drum, a cocking device for normally retaining said ejector mechanism in cocked position, resilient means urging said ejector mechanism to move from its cocked position into engagement with the object at the discharge position, means operative on movement of the ejector mechanism from its cocked position towards the objects at the discharge position for releasing the retaining member associated with said object, manually operable means for releasing the cocking device to free said ejector mechanism for movement to engage said object and eject it radially from the drum, means coacting with said ejector mechanism after ejection of said object for automatically returning it to cocked position, a switch arranged to be actuated by said ejector mechanism on its return to cocked position to complete a circuit to start said electric motor, and a further switch for stopping said motor arranged to be actuated on arrival of the next object at the discharge position.

4. Ejecting apparatus comprising a rotatable drum having in its periphery a plurality of longitudinal recesses each adapted to receive an object, a retaining member in each recess for securing the object in said recess to the drum, power means for rotating the drum about its axis to bring said objects in succession to a discharge position, pivotally mounted ejector mechanism disposed adjacent to said drum, a latch for latching the ejector mechanism in its cocked position, a solenoid for controlling said latch, spring means urging said ejector mechanism to move from its cocked position into engagement with the object at the discharge position, means operative on movement of the ejector mechanism from its cocked position towards the object at the discharge position for releasing the retaining member associated with said object, a manually operable switch for operating said solenoid to release said latch to free said ejecting mechanism for movement to engage said object and eject it radially from the drum, an electric motor for recocking the ejector mechanism, and switches, controlled by the ejector mechanism on completion of the ejection operation and on return of the ejector mechanism to cocked position for respectively starting and stopping said motor.

5. Ejecting apparatus as claimed in claim 4, comprising a further electric motor for rotating said drum, a further switch coacting with said ejector mechanism on return thereof to cocked position to complete a circuit for starting said further electric motor, and a switch for stopping said further electric motor arranged to be actuated by the next object on arrival thereof at the discharge position.

6. Ejecting apparatus as claimed in claim 1, wherein said ejector mechanism comprises a pair of pivoted arms arranged to engage opposite ends of the object to be ejected and comprising a cam carried by one of said arms for releasing the retaining member of the object at the discharge position.

7. Ejecting apparatus as claimed in claim 4, wherein the ejector mechanism comprises a shaft, a pair of arms on said shaft adapted to engage opposite ends of the object to be ejected, and a ratchet on said shaft, and wherein the latch is constituted by a pawl engaging said ratchet, said solenoid being mounted on a shaft driven by said electric motor and normally maintaining said pawl in engagement with said ratchet.

FRANK HENRY ROBERTSON.

References Cited in the file of this patent

UNITED STATES PATENTS

| Number | Name | Date |
|---|---|---|
| 281,356 | Fischer | July 17, 1883 |
| 1,328,929 | McDaniel | Jan. 27, 1920 |
| 1,916,680 | Miller | July 4, 1933 |
| 2,509,552 | Wolf | May 30, 1950 |

FOREIGN PATENTS

| Number | Country | Date |
|---|---|---|
| 457,621 | France | July 17, 1913 |
| 332,318 | Germany | Jan. 27, 1921 |
| 315,851 | Great Britain | Aug. 18, 1930 |